United States Patent

Noguchi

[11] 4,129,355
[45] Dec. 12, 1978

[54] LIGHT BEAM SCANNER WITH PARALLELISM ERROR CORRECTION

[75] Inventor: Masaru Noguchi, Asaka, Japan

[73] Assignee: Fuji Photo Film Co., Ltd., Minami-ashigara, Japan

[21] Appl. No.: 811,927

[22] Filed: Jun. 30, 1977

[30] Foreign Application Priority Data

Jul. 2, 1976 [JP] Japan .................. 51-79313

[51] Int. Cl.² ............................................. G02B 27/17
[52] U.S. Cl. ................................................... 350/6.7
[58] Field of Search ............. 350/7, 320, 6.7, 6.8; 358/206

[56] References Cited

U.S. PATENT DOCUMENTS

| 3,750,189 | 7/1973 | Fleischer | 350/7 |
| 3,897,132 | 7/1975 | Meeussen et al. | 350/7 |
| 4,054,360 | 10/1977 | Oosaka et al. | 350/7 |

Primary Examiner—Jon W. Henry
Attorney, Agent, or Firm—Sughrue, Rothwell, Mion, Zinn and Macpeak

[57] ABSTRACT

A light beam scanner employs two rotary multi-surfaced mirrors 510, 520 manufactured together and having the same parallelism error characteristics between paired reflecting surfaces, and a relay lens 610 disposed between the two mirrors. The synchronously rotated mirrors are disposed at the conjugate planes of the relay lens, whereby parallelism errors are eliminated by subtractive cancellation.

1 Claim, 8 Drawing Figures

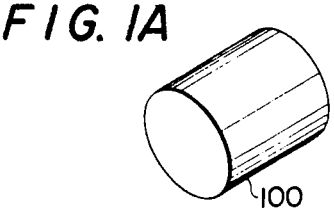
FIG. IA
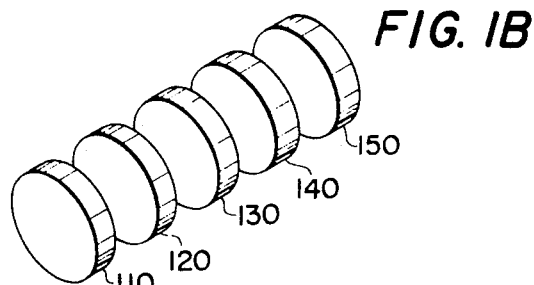
FIG. IB
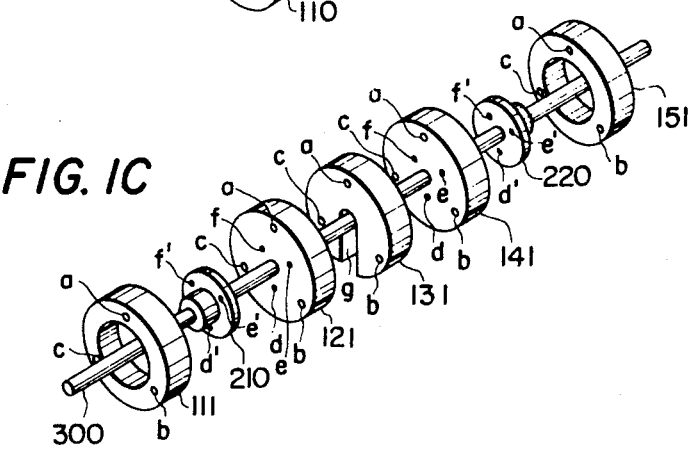
FIG. IC
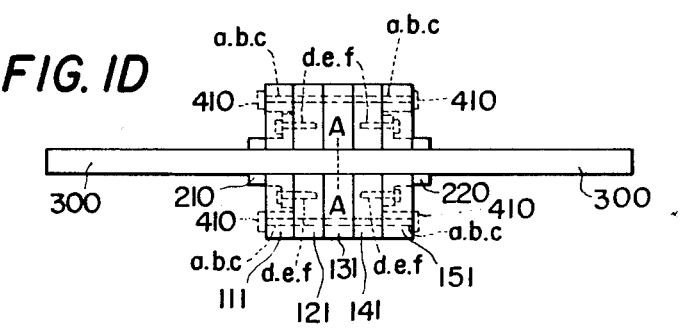
FIG. ID
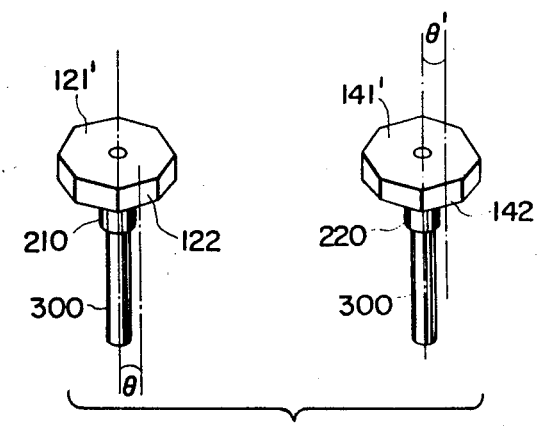
FIG. IE

LIGHT BEAM SCANNER WITH PARALLELISM ERROR CORRECTION

BACKGROUND OF THE INVENTION

This invention relates to a light beam scanner in which parallelism errors of a rotary multi-surfaced mirror are corrected.

Recently, a number of devices have been developed for reading and recording information by scanning light beams, such as laser beams, and a rotary multi-surfaced mirror is typically employed as a light deflector in such devices. Parallelism errors often exist between the rotary shaft and the reflecting surfaces of such a mirror, however, even if manufactured with high precision, and such errors cause the scanning beam to be displaced perpendicular to its deflection direction. That is, the locii of the scanned light beams on the image plane, due to reflection by the various surfaces of the rotary mirror, is not a pure line but has a significant width dimension.

Some methods for forming coincident scan lines by optically correcting lateral displacement caused by parallelism errors have been proposed. For instance, in laid open Japanese Patent Application publication No. 33642/1972, correction amounts for parallelism errors are measured and stored in a memory device, and an additional light deflector is driven by signals from the memory device in synchronization with the rotation of the multi-surfaced mirror to thus eliminate lateral scan line deviations. This system is disadvantageous, however, owing to the cost and complexity of the additional light deflector, its drive circuits, and the necessary memory device.

In U.S. Pat. No. 3,750,189, two cylindrical lenses are employed. A line image is formed in parallel with a plane formed by a group of light beams deflected onto the reflecting surfaces of a rotary mirror by the first cylindrical lens, while with the second cylindrical lens the deflection point on the reflecting mirror surfaces and the scanning plane are maintained in a predetermined relationship between the object point and the image point, thereby eliminating lateral scan line deviations caused by parallelism errors. This system is disadvantageous in that it requires two cylindrical lenses, it is difficult to precisely mount them at predetermined positions, and it is also difficult to accurately manufacture such cylindrical lenses.

SUMMARY OF THE INVENTION

Accordingly, an object of this invention is to provide a light beam scanner in which the parallelism errors of a rotary multi-surfaced mirror are fully corrected in a simple and expedient manner. This is achieved by providing two rotary multi-surfaced mirrors in a light beam scanner having the same parallelism error characteristics, the mirrors being synchronously rotated. A relay lens is disposed between the two rotary mirrors such that the reflecting surfaces thereof are positioned at conjugate planes of the lens with respect to its object and image points, thus providing a magnification factor of 1. In this manner, any parallelism error of one mirror is equal and opposite to, and thus subtractively cancelled by, the parallelism error of the other mirror.

BRIEF DESCRIPTION OF THE DRAWINGS

In the drawings:

FIGS. 1(A)–(E) are sequence diagrams for describing a method of manufacturing two rotary multi-surfaced mirrors having the same parallelism error;

DETAILED DESCRIPTION OF THE INVENTION

Figure 2A:
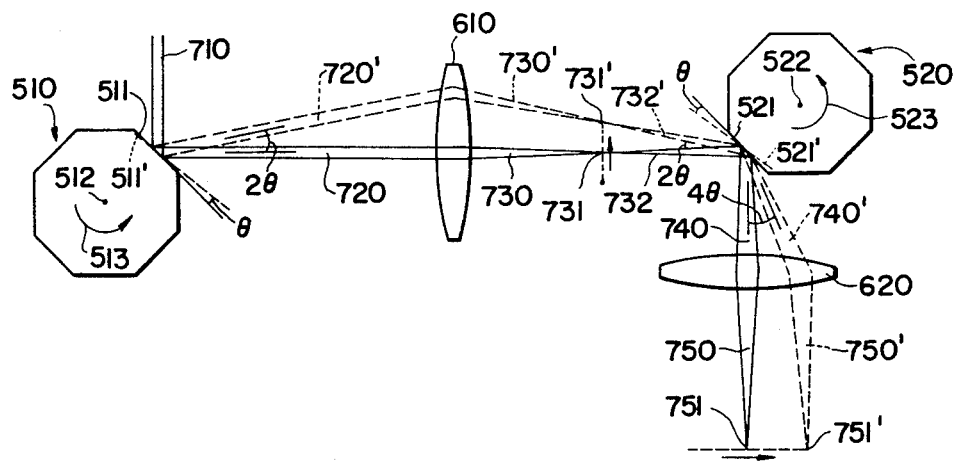
FIGS. 2(A) and (B) are explanatory schematic diagrams illustrating the optical paths in a light beam scanner according to this invention.

The present invention is based on the fact that, although it is difficult to eliminate parallelism errors in the manufacture of rotary multi-surfaced mirrors, it is possible to prepare two such mirrors having the same parallelism errors.

FIG. 1 illustrates a method of manufacturing two rotary multi-surfaced mirrors having equal parallelism error characteristics. First, a cylinder of mirror material 100 such as stainless steel or glass, as shown in FIG. 1(A), is cut into basic pieces 110, 120, 130, 140 and 150 having suitable thicknesses as shown in FIG. 1(B). The two intermediate pieces 120 and 140 are employed as the mirror elements. If the material is metal, as indicated by reference numerals 121 and 141, retaining holes a, b and c, threaded holes d, e and f, and a central through hole for receiving a shaft 300 are bored in each of the basic pieces 120 and 140. The diameter of the central through hole is made slightly larger than that of the shaft so that it can be relatively smoothly inserted through the hole. Fixing members 210 and 220 are then prepared by boring therein through holes d', e', and f' corresponding to the threaded holes d, e and f and a central through-hole for receiving the shaft. The diameter of the central through hole is made slightly smaller than that of the shaft 300 so that the shaft must be inserted through the fixing members by force. The basic pieces 110 and 150 are employed as dummy pieces 111 and 151, in which retaining holes a, b and c are bored. A central through hole whose diameter is larger than the outside diameter of the fixing members 210 and 220 is formed in each of the dummy pieces. The basic piece 130 is used as a spacer 131, in which retaining holes a, b and c, and a slot g are formed. The width of the slot g is larger than the diameter of the shaft 300. The completed preparation of the various pieces is shown in FIG. 1(C).

The basic pieces and the fixing members thus prepared are mounted on the shaft 300 as follows. First of all, the spacer 131 is placed on the middle part of the shaft, and the mirror pieces 121 and 141 are then slipped on the shaft from both ends thereof. The fixing members 210 and 220 are then press-fitted on the shaft, and are secured to the mirror pieces 121 and 141 by screws or the like through the holes d', e' and f' and correspondingly aligned threaded holes d, e and f. The fixing members are further secured to the shaft with adhesive. The dummy pieces 111 and 151 are next placed on the shaft from both ends thereof, and all of the pieces 111, 121, 131, 141 and 151 are secured together by bolts 410 through the retaining holes a, b and c, to arrive at the mounting arrangement shown in FIG. 1(D).

The outer peripheral surface of the overall cylindrical assembly is then accurately machined and polished in a well know manner to provide a plurality of precisely angled reflecting surfaces in an equilateral polygon configuration, after which the bolts 410 are removed. The spacer 131 and dummy pieces 111 and 151 are then removed, and the shaft 300 is cut into two parts at the middle point thereof along the surface A—A in FIG. 1(D) to provide the two rotary multi-surfaced mirrors shown in FIG. 1(E), already mounted on the shafts 300.

As these two multi-surfaced mirrors 121' and 141' are manufactured by a processes in which their corresponding surfaces are subjected to the same machining and polishing operations, their parallelism error characteristics and mounting errors on the shaft 300 are equal. That is, the angles $\theta$ and $\theta'$ between the corresponding or paired mirror surfaces 122 and 142, for example, and the shaft 300 are equal.

Where glass is employed as the mirror material, the rotary mirror pieces 121 and 141 are secured to the fixing members 210 and 220 by providing through holes in the mirror pieces and inserting the fixing members 210 and 220 thereinto with adhesive.

The rotation of the two mirrors at an equal speed is readily carried out using an appropriate timing belt or coupling gear mechanism with a single electric drive motor. The initial phase control of the two mirrors such that their corresponding surfaces are paired during rotation at the same relative angles of rotation, whereby corresponding surfaces simultaneously reflect and deflect the same light beam during scanning, can be readily achieved by properly controlling the initial installation of the timing belt over the mirror shafts or the initial engagement of the gears.

FIG. 2(A) shows a plan view of a light beam scanner according to the invention, wherein first and second rotary multi-surfaced mirrors 510 and 520 have the same parallelism error characteristics, and a relay lens 610 is disposed between them. The initial phases of the two rotary mirrors are made coincident or synchronized with each other so that the surface 511 of the first mirror 510 and the surface 521 of the second mirror 520 are mates or paired, and thus have the same parallelism error. The relay lens is positioned such that the reflecting surface 511 formes an equal sized image, with a magnification factor of 1, at the location of the reflecting surface 521.

First, consider the case where the deflection angle is zero, i.e. at the center of the scan. Parallel light beams 710 applied to the first rotary mirror 510 are reflected by surface 511 into parallel light beams 720, which are condensed by the lens 610 into a light beam 730 focused at a point 731. A light beam 732 diverging from the point 731 is reflected by mirror surface 521 to form a light beam 740, which is condensed through a lens 620 into a beam 750 focused at a point 751 on the scanning plane or surface.

Consider next the case where the first and second mirrors 510, 520 have rotated through an angle $\theta$ around their shaft axes 512 and 522 in CCW directions 513 and 523, respectively, and assume that the reflecting surfaces 511 and 521 occupy angular positions 511' and 521', respectively. In this case, the beams 710 are reflected by surface 511' to form parallel beams 720' condensed through the lens 610 into light beam 730' which is focused at point 731'. A light beam 732' diverging from point 731' is reflected by surface 521' to form a beam 740', which is condensed through lens 620 into a beam 750' focused at point 751' on the scanning plane.

When the rotation angles of the first and second mirrors are $\theta$, the deflection angle of the light beam reflected by the first mirror 510 is thus $2\theta$, and the deflection angle of the light beam reflected by the second mirror 520 is $4\theta$. This implements normal beam progress or movement in the scanning direction.

Figure 2B:
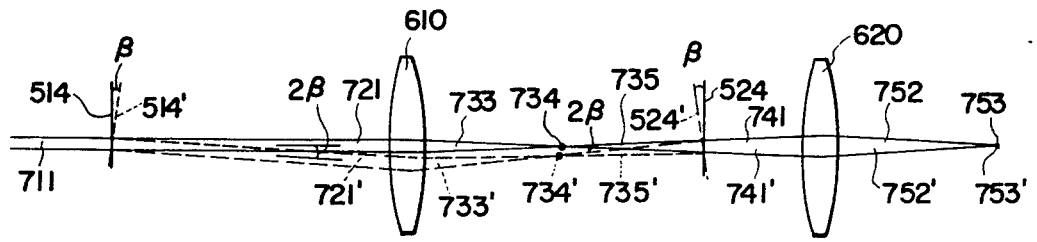

Referring now to the simplified schematic diagram of FIG. 2(B), the correction of parallelism errors in the rotary mirror surfaces will be described. Assume first that the mirror shaft axes 512 and 522 are parallel to each other, and that the respective reflecting surfaces 514 and 524 are parallel to their rotary shaft axes, i.e. there is no parallelism error. A parallel light beam 711 is then reflected by surface 514 to form a parallel beam 721 condensed through lens 610 into a beam 733 focused at point 734. A diverging light beam 735 is reflected by surface 524 to form a beam 741 condensed through lens 620 into a beam 752 focused at point 753.

Consider now the case where the reflecting surfaces of the first and second rotary mirrors have the same parallelism error $\beta$ defined by the angle between two paired reflecting surfaces and their shaft axes. In this situation the parallel light beam 711 is reflected by surface 514' to form a parallel beam 721' condensed through lens 610 into a beam 733 focused at point 734'. If the surface 514' of the first mirror has a parallelism error $\beta$, the reflected beam 721' deviates by an angle of $2\beta$ from the true (no error) beam 721. Accordingly, the focal point 734' also deviates from point 734 by a distance equal to $f \cdot \tan 2\beta$, where the focal length of the lens 610 is f. If the reflecting surfaces 514' and 524' are arranged on the conjugate planes of the lens 610, the light beam 735' diverging from point 734' forms an angle of $2\beta$ with the light beam 735 obtained in the case of no parallelism error. Accordingly, the light beam 741' reflected by the mirror surface 524' having a parallelism error $\beta$ is completely coincident with the light beam 741 reflected through no parallelism error, and the scanning plane focal point 753' formed by the light beam 752' condensed through lens 620 is similarly coincident with the focal point 753 obtained when no parallelism error is involved. Thus, the lateral parallelism deviation of the line on the image plane is completely corrected by optical subtractive cancellation.

Figure 3:
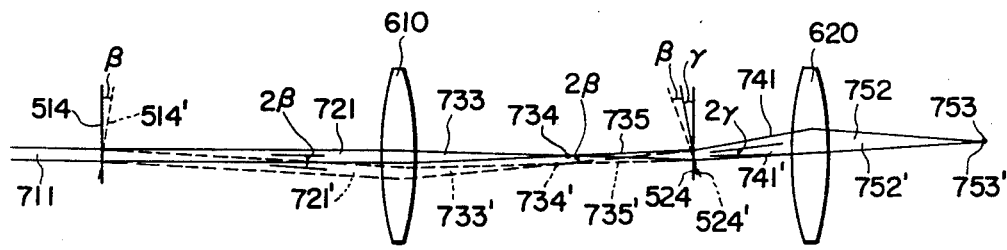
FIG. 3 is an explanatory diagram for describing the operation of the light beam scanner of the invention when the mirror axes are not parallel.

FIG. 3 illustrates how, even if the shaft 512 of the first mirror 510 is not parallel to the shaft 522 of the second mirror 520, parallelism error can still be corrected according to the invention.

Assuming that the inclination or error angle between the rotary shafts of the first and second mirrors is $\gamma$, reference numerals 514 and 524 designate reflecting surfaces parallel to their respective shafts and reference numerals 514' and 524' designate reflecting surfaces having an equal parallelism error angle of $\beta$ with respect to their shafts. A parallel light beam 711 is reflected by mirror surface 514 to form a parallel light beam 721 condensed through lens 610 into a light beam 733 focused at point 734. A light beam 735 diverging therefrom is reflected by mirror surface 524 to form a beam 741 deviating by an angle of $2\gamma$, which is condensed through lens 620 into beam 752 focused at point 753 on the scanning plane.

When the parallel light beam 711 is reflected by mirror surface 514' having a parallelism error $\beta$, it becomes beam 721' condensed through lens 610 into beam 733' focused at point 734'. Since the reflecting surface 514' of the first rotary mirror has a parallelism error $\beta$, the beam 721' is deflected by an angle of $2\beta$ from the beam 721. Accordingly, the point 734' formed by the lens 610 deviates from $f \cdot \tan 2\beta$ from the point 734. As the mirror surfaces 514' and 524' are arranged on the conjugate planes of the relay lens 610, the beam 735' diverging from point 734' forms an angle $2\beta$ with the beam 735 obtained with no parallelism error. Therefore, the light beam 741' reflected from the mirror surface 524' (having a parallelism error $\beta$) is coincident with the reflected light beam 741, which deviates by as much as $2\gamma$ even when no parallelism error is involved. The focal point 753' on the scanning plane thus coincides with the point 753 obtained with no parallelism error, whereby the correction of the latter is independent of deviations from pure parallel alignment of the rotary mirror axes. That is, any such alignment errors equally affect both true beams and those deviating due to parallelism errors.

What is claimed is:

1. A light beam scanner, comprising:
   (a) a first rotary multi-surfaced mirror for reflecting and deflecting a light beam, said first mirror having a plurality of first reflective surfaces;
   (b) a second rotary multi-surfaced mirror for reflecting and deflecting the light beam reflected from said first mirror, said second mirror having a plurality of second reflective surfaces, each of said second reflective surfaces being paired with a corresponding one of said first reflective surfaces;
   (c) means for synchronously rotating said first and second mirrors such that said light beam reflected and deflected from a first reflective surface on said first rotary mirror is always reflected and deflected by the corresponding second reflective surface on said second rotary mirror;
   (d) the angular deviation between each of said second reflective surfaces and the second rotational axis being the same as the angular deviation between the corresponding first reflective surface and the first rotational axis; and
   (e) a relay lens disposed in the optical path between the two mirrors;
   (f) the two mirrors being positioned in the conjugate planes of the relay lens to thereby provide a magnification factor of 1, whereby an angular beam deflection error resulting from said angular deviation of a first reflective surface will be corrected by an equal and opposite angular beam deflection error resulting from said angular deviation of the corresponding second reflective surface.

* * * * *